(12) United States Patent
Nishioka (10) Patent No.: US 12,230,984 B2
(45) Date of Patent: Feb. 18, 2025

(54) BATTERY ABNORMALITY DETECTION DEVICE, BATTERY ABNORMALITY DETECTION METHOD, AND RECORDING MEDIUM RECORDED WITH BATTERY ABNORMALITY DETECTION PROGRAM

(71) Applicant: TOYOTA JIDOSHA KABUSHIKI KAISHA, Toyota (JP)

(72) Inventor: Kosuke Nishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 542 days.

(21) Appl. No.: 17/700,697

(22) Filed: Mar. 22, 2022

(65) Prior Publication Data

US 2022/0368138 A1 Nov. 17, 2022

(30) Foreign Application Priority Data

May 13, 2021 (JP) .................................. 2021-081816

(51) Int. Cl.
*H01M 10/42* (2006.01)
*H02J 7/00* (2006.01)

(52) U.S. Cl.
CPC ....... *H02J 7/0019* (2013.01); *H01M 10/4257* (2013.01); *H02J 7/0048* (2020.01); *H02J 7/007182* (2020.01); *H01M 2010/4271* (2013.01); *H01M 2220/20* (2013.01)

(58) Field of Classification Search
None
See application file for complete search history.

(56) References Cited

U.S. PATENT DOCUMENTS

2004/0155629 A1 8/2004 Kobayashi et al.
2018/0088180 A1* 3/2018 Kamata ................ H02J 7/0013

FOREIGN PATENT DOCUMENTS

JP 2018-054390 A 4/2018

* cited by examiner

*Primary Examiner* — Wyatt P McConnell
(74) *Attorney, Agent, or Firm* — Oliff PLC (57) ABSTRACT

A battery abnormality detection device that: for an equalization circuit including a discharge circuit provided with a switch that, in a case of being switched ON, causes a battery cell to discharge, and including a detector connected to the battery cell in parallel to the discharge circuit so as to detect a voltage of the battery cell, acquires a first voltage in a case in which the switch has been switched OFF and a second voltage in a case in which the switch has been switched ON, as detected by the detector, and estimates, from a detected value of one of the acquired first voltage or second voltage, an estimated value of another of the acquired first voltage or second voltage, and determines whether or not an abnormality has occurred in the equalization circuit based on the detected value and the estimated value.

12 Claims, 6 Drawing Sheets

BATTERY ABNORMALITY DETECTION DEVICE, BATTERY ABNORMALITY DETECTION METHOD, AND RECORDING MEDIUM RECORDED WITH BATTERY ABNORMALITY DETECTION PROGRAM

CROSS-REFERENCE TO RELATED APPLICATION

This application is based on and claims priority under 35 USC 119 from Japanese Patent Application No. 2021-081816 filed on May 13, 2021, the disclosure of which is incorporated by reference herein.

BACKGROUND

Technical Field

The present disclosure relates to a battery abnormality detection device, a battery abnormality detection method, and a recording medium recorded with a battery abnormality detection program.

RELATED ART

Japanese Patent Application Laid-Open (JP-A) No. 2018-54390 proposes a voltage detection device including a voltage detection unit that detects the voltage of a battery, a discharge circuit that causes the battery to discharge, and a protection circuit provided between the voltage detection unit and the discharge circuit and battery. The voltage detection device estimates an internal resistance of the protection circuit based on a first voltage detected by the voltage detection unit when the discharge circuit is in a non-operational state and a second voltage detected by the voltage detection unit when the discharge circuit is in an operational state. The voltage detection device then determines whether or not the protection circuit is in a partially disconnected state based on the result of this estimation.

In JP-A No. 2018-54390, disconnection or partial disconnection of the protection circuit can be identified by checking the difference between the voltage when the discharge circuit is operating and the voltage when the discharge circuit has stopped operating. However, there is room for improvement since abnormalities such as half shorting and leakage of elements cannot be identified.

SUMMARY

An aspect of the present disclosure is a battery abnormality detection device that includes: a memory; and a processor coupled to the memory, the processor being configured to: for an equalization circuit including a discharge circuit provided with a switch that, in a case of being switched ON, causes a battery cell to discharge, and including a detector connected to the battery cell in parallel to the discharge circuit so as to detect a voltage of the battery cell, acquire a first voltage in a case in which the switch has been switched OFF and a second voltage in a case in which the switch has been switched ON, as detected by the detector, and estimate, from a detected value of one of the acquired first voltage or second voltage, an estimated value of another of the acquired first voltage or second voltage, and determine whether or not an abnormality has occurred in the equalization circuit based on the detected value and the estimated value.

DETAILED DESCRIPTION

Figure 1:
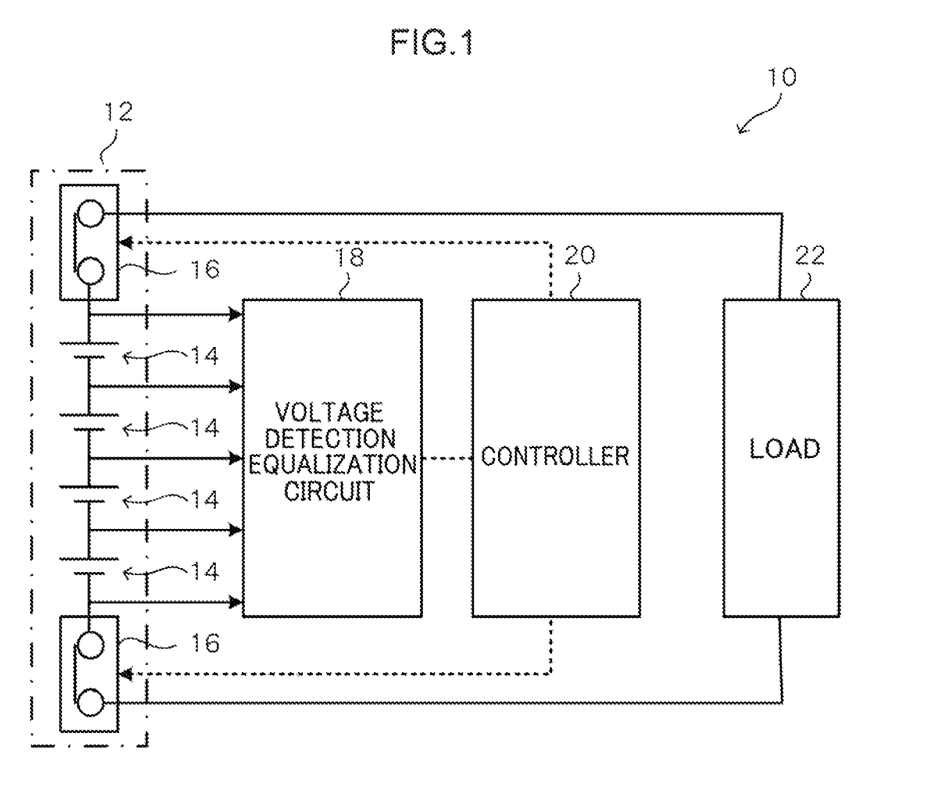
FIG. 1 is a diagram illustrating an example of a schematic configuration of a power supply device according to an exemplary embodiment.

Detailed explanation follows regarding an example of an exemplary embodiment of the present disclosure, with reference to the drawings. FIG. 1 is a diagram illustrating a schematic configuration of a power supply device according to the present exemplary embodiment.

A power supply device 10 according to the present exemplary embodiment is configured including a battery 12, a voltage detection equalization circuit 18, a controller 20, and a load 22, and supplies power from the bane 12 to the load 22. Note that in the configuration of the power supply device 10, the controller 20 corresponds to a battery abnormality detection device.

The battery 12 is configured by a battery stack in which plural battery cells 14 are coupled together in series, and as an example a lithium-ion battery stack is employed therefor. An electric motor installed in a hybrid vehicle, an electric vehicle, or the like is an example of the load 22, and this electric motor is driven by power from the battery 12. The power supply device 10 may employ a 12V system, a 48V system, or another voltage system. An AC inverter, a refrigerator, and the like are examples of the load in cases in which a 48V system is employed. Note that examples of the load 22 in respective voltage systems are not limited thereto, and there may be various other loads.

A main relay 16 serving as a main switch is provided to the battery 12. The main relay 16 is switched ON and OFF under the control of the controller 20, and power supply from the battery 12 to the load 22 is switched ON and OFF as a result. Although an example is described in which the main relay 16 is provided inside a battery pack that houses the respective battery cells 14 of the battery 12 in the present exemplary embodiment, the main relay 16 may be provided outside the battery pack. Moreover, although an example is described in which the main relay 16 is provided on both a plus side and a minus side of the battery 12 in the present exemplary embodiment, configuration may be such that the main relay 16 is only provided on one of these sides.

The voltage detection equalization circuit 18 includes a function to detect voltages of the respective battery cells 14, and a function to cause respective battery cells to discharge so as to equalize the voltages. As an example, in the present exemplary embodiment, an integrated circuit (IC) including a function to detect the voltages of the battery cells 14 and a function to cause the battery cells 14 to discharge is employed therefor.

The controller 20 controls the switching ON and OFF of the main relay 16, and also control switching ON and OFF of equalization FETs 24 in the voltage detection equalization circuit 18. The controller 20 also performs processing to detect for abnormalities in the battery 12.

Figure 2:
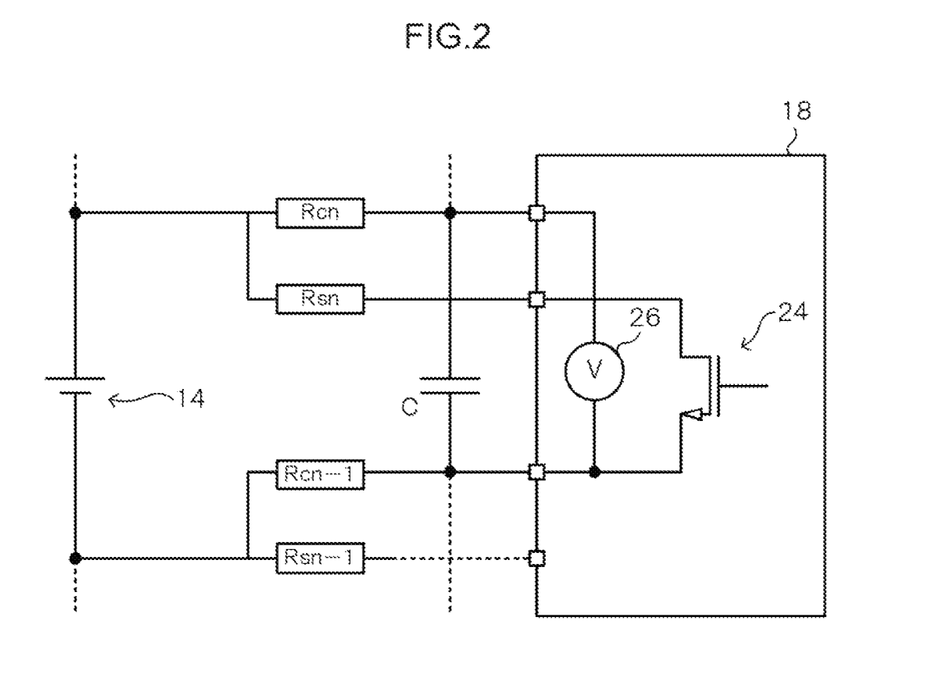
FIG. 2 is a diagram illustrating an example of a detailed configuration of a power supply device, focusing on a single battery cell.

Explanation follows regarding detailed configuration of the respective battery cells of the battery 12 and the voltage detection equalization circuit 18. FIG. 2 is a diagram illustrating a detailed configuration of the power supply device 10, focusing on a single battery cell 14.

A first terminal of a resistor Rsn that limits current is connected to a plus side of this battery cell 14. An equalization FET 24 that equalizes the voltage of the voltage detection equalization circuit 18 is connected to a second terminal of the resistor Rsn. A first terminal of a resistor Rcn-1 is connected to a minus side of the battery cell 14. A second terminal of the resistor Rcn-1 is connected to the equalization FET 24. The equalization FET 24 functions as a switch that is switched ON and OFF under the control of the controller 20. When the equalization FET 24 is switched ON, power in the battery cell 14 is discharged, Namely, the resistor Rsn, the equalization FET 24, and the resistor Rcn-1 correspond to a discharge circuit.

A first terminal of a resistor Rcn is also connected to the plus side of the battery cell 14. A first terminal of an AD converter 26 of the voltage detection equalization circuit 18 is connected to a second terminal of the resistor Rcn. The first terminal of the resistor Rcn-1 is connected to the minus side of the battery cell 14. A second terminal of the AD converter 26 is connected to the second terminal of the resistor Rcn-1. Namely, the AD converter 26 and the equalization FET 24 are connected in parallel to the battery cell 14. The AD converter 26 corresponds to a detector that detects the voltage of the battery cell 14, performs analog-to-digital (AD) conversion, and outputs a voltage detection result for the battery cell 14 to the controller 20. The AD converter 26 may employ a switchover circuit such as a multiplexer such that plural voltages are measured using a single AD converter 26. Note that the resistors Rcn, Rcn-1 configure circuitry that are common to an adjacent battery cell 14. The resistors Rsn, Rcn, and Rcn-1 respectively function as current limiting resistors.

A first terminal of a capacitor C is connected between the resistor Rcn and the AD converter 26. A second terminal of the capacitor C is connected between the resistor Rcn-1 and the AD converter 26. The resistor Rcn and the capacitor C configure a low-pass filter.

Figure 3:
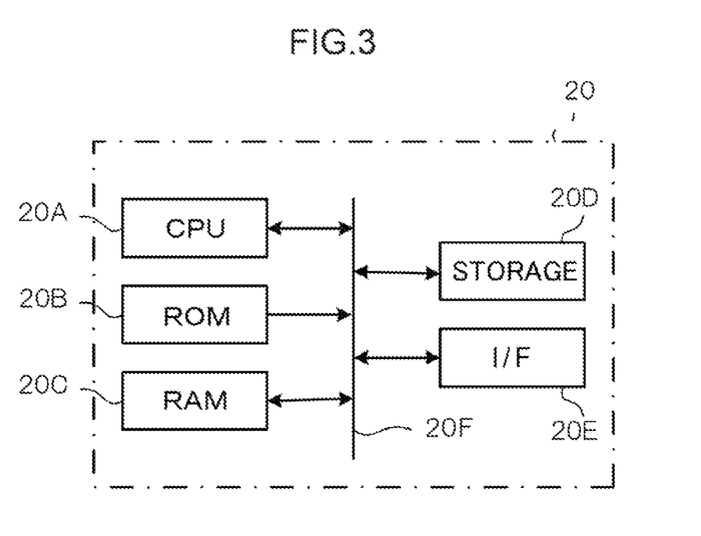
FIG. 3 is a block diagram illustrating a configuration of a controller of a power supply device according to an exemplary embodiment.

Next, explanation follows regarding detailed configuration of the controller 20. FIG. 3 is a block diagram illustrating the configuration of the controller 20 of the power supply device 10 according to the present exemplary embodiment.

As illustrated in FIG. 3, the controller 20 includes a central processing unit (CPU) 20A serving as an example of a hardware processor, read only memory (ROM) 20B corresponding to memory, random access memory (RAM) 20C, storage 20D, and an interface (I/F) 20E.

The CPU 20A is a central processing unit that oversees overall operation of the device by loading and executing various programs. Various control programs, various parameters, and so on are pre-stored in the ROM 20B. The RAM 20C is employed as a workspace or the like when the various programs are executed by the CPU 20A. The storage 20D is configured by various memory such as flash memory, a hard disk drive (HDD), and a solid state drive (SSD), and stores various data, application programs, and the like. The I/F 20E is connected to the voltage detection equalization circuit 18 and the main relay 16. These respective sections of the controller 20 are electrically connected to one another by a system bus 20F.

Using the above-described configuration, the controller 20 is able to access the ROM 20B, the RAM 20C, and the storage 20D using the CPU 20A, and to control the voltage detection equalization circuit 18 and the main relay 16 connected to the I/F 20E.

The controller 20 of the power supply device 10 according to the present exemplary embodiment has a function of detecting for abnormalities in the battery 12 and in elements such as the capacitor C and the equalization FET 24.

Specifically, the controller 20 acquires a voltage Va when the equalization FET 24 has been switched OFF, and a voltage Vb when the equalization FET 24 has been switched ON, from the AD converter 26.

The controller 20 also estimates the voltage Va from the voltage Vb measured by the AD converter 26 using Equation (1) so as to compute an estimated voltage Va calc.

$$Va\ calc = Vb \times \frac{Rcn - 1 + Rsn}{Rsn} \quad (1)$$

If there are no abnormalities in the battery 12 or the respective elements, the estimated voltage Va calc is equivalent to the voltage Va. Thus, detection for abnormalities in the battery 12 and elements is performed by comparing the estimated voltage Va calc to the measured voltage Va. For example, an abnormality is determined to have occurred in cases in which the estimated voltage Va calc and the voltage Va diverge by a predetermined threshold or greater.

In cases in which an abnormality has been detected, as a failsafe, the controller 20 switches the main relay 16 OFF such that usage of the battery cell 14 where the abnormality was detected is stopped.

Figure 4:
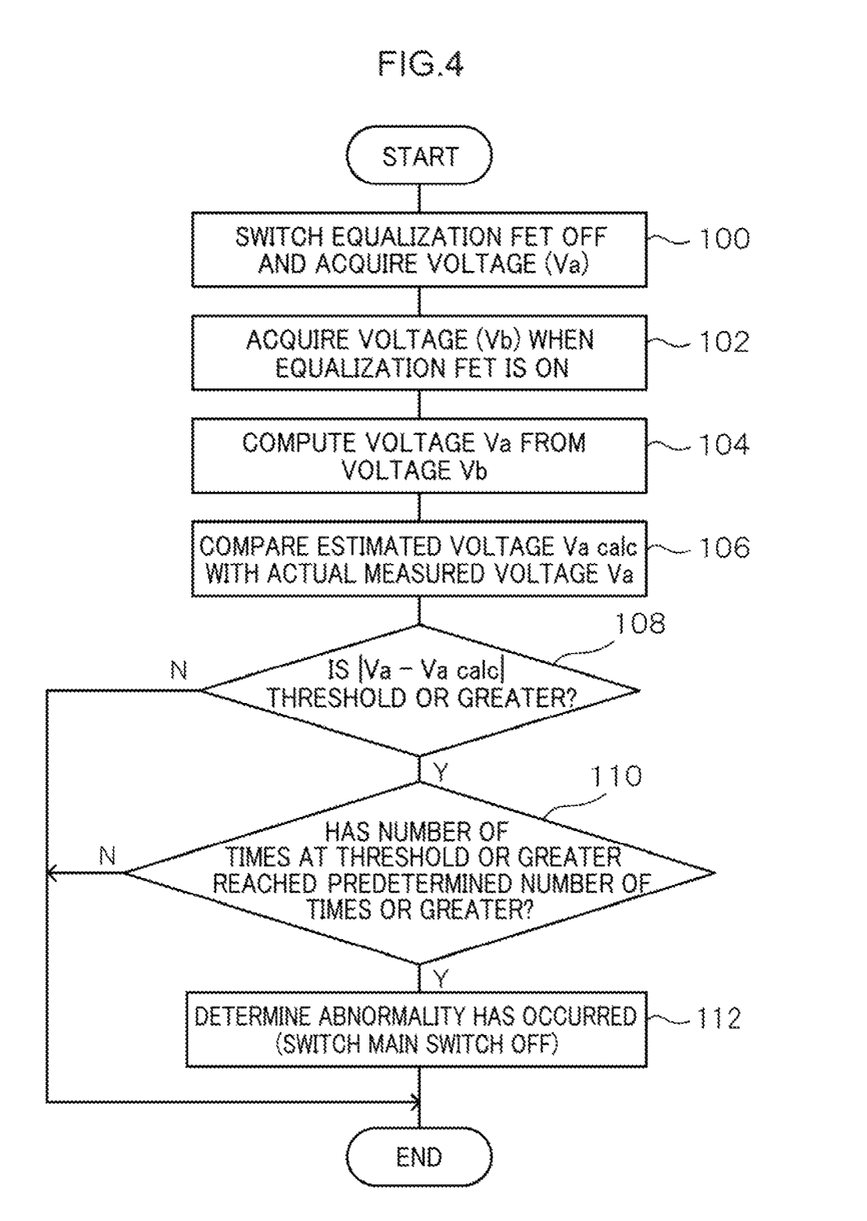
FIG. 4 is a flowchart illustrating an example of a flow of processing performed by a controller of a power supply device according to an exemplary embodiment.

Next, detailed explanation follows regarding processing performed by the controller 20 of the power supply device 10 according to the present exemplary embodiment configured as described above. FIG. 4 is a flowchart illustrating an example of a flow of processing performed by the controller 20 of the power supply device 10 according to the present exemplary embodiment. Note that although the processing in FIG. 4 is described as processing with respect to a single battery cell 14, this processing is performed on each of the battery cells 14 in sequence.

At step 100, the CPU 20A switches the equalization FET 24 OFF and acquires the voltage Va measured by the AD converter 26. Processing then transitions to step 102.

At step 102, the CPU 20A switches the equalization FET 24 ON and acquires the voltage Vb measured by the AD converter 26. Processing then transitions to step 104.

At step 104, the CPU 20A computes the voltage Va from the voltage Vb, and processing transitions to step 106. Namely, the estimated voltage Va calc is computed from the voltage Vb using Equation (1) described previously.

At step 106, the CPU 20A compares the estimated voltage Va calc to the actual measured voltage Va, and processing transitions to step 108.

At step 108, the CPU 20A determines whether or not |Va−Va calc| is a predetermined threshold or greater. Namely, determination is made as to whether or not the estimated voltage Va calc diverges from the actual measured voltage Va by the threshold or greater. The series of processing is ended in cases in which this determination is negative, whereas processing transitions to step 110 in cases in which this determination is affirmative.

At step 110, the CPU 20A determines whether or not the number of times at the threshold or greater has reached a predetermined number of times or greater. This determination as to whether or not the number of times at the threshold or greater has reached the predetermined number of times or greater is performed in order to suppress incorrect determination of an abnormality. The series of processing is ended in cases in which this determination is negative, whereas processing transitions to step 112 in cases in which this determination is affirmative. Note that the processing of step 110 may be omitted.

At step 112, the CPU 20A determines that an abnormality has occurred, switches the main relay 16 OFF, and ends the series of processing. Thus, power supply to the load 22 is stopped in cases in which an abnormality is determined to have occurred, thereby enabling a failsafe to be implemented in the event of an abnormality.

Thus, in the power supply device 10 according to the present exemplary embodiment, the voltage Va when the equalization FET 24 is OFF is estimated from the voltage Vb when the equalization FET 24 is ON, and this estimated voltage Va calc is compared to the measured voltage Va, thereby enabling any abnormalities in the battery cell 14 and elements such as the capacitor C to be detected.

In the processing in FIG. 4, abnormality detection is performed on each of the plural battery cells 14 in sequence. Explanation follows regarding an example in which abnormality detection is performed collectively on plural of the battery cells 14.

Figure 5:
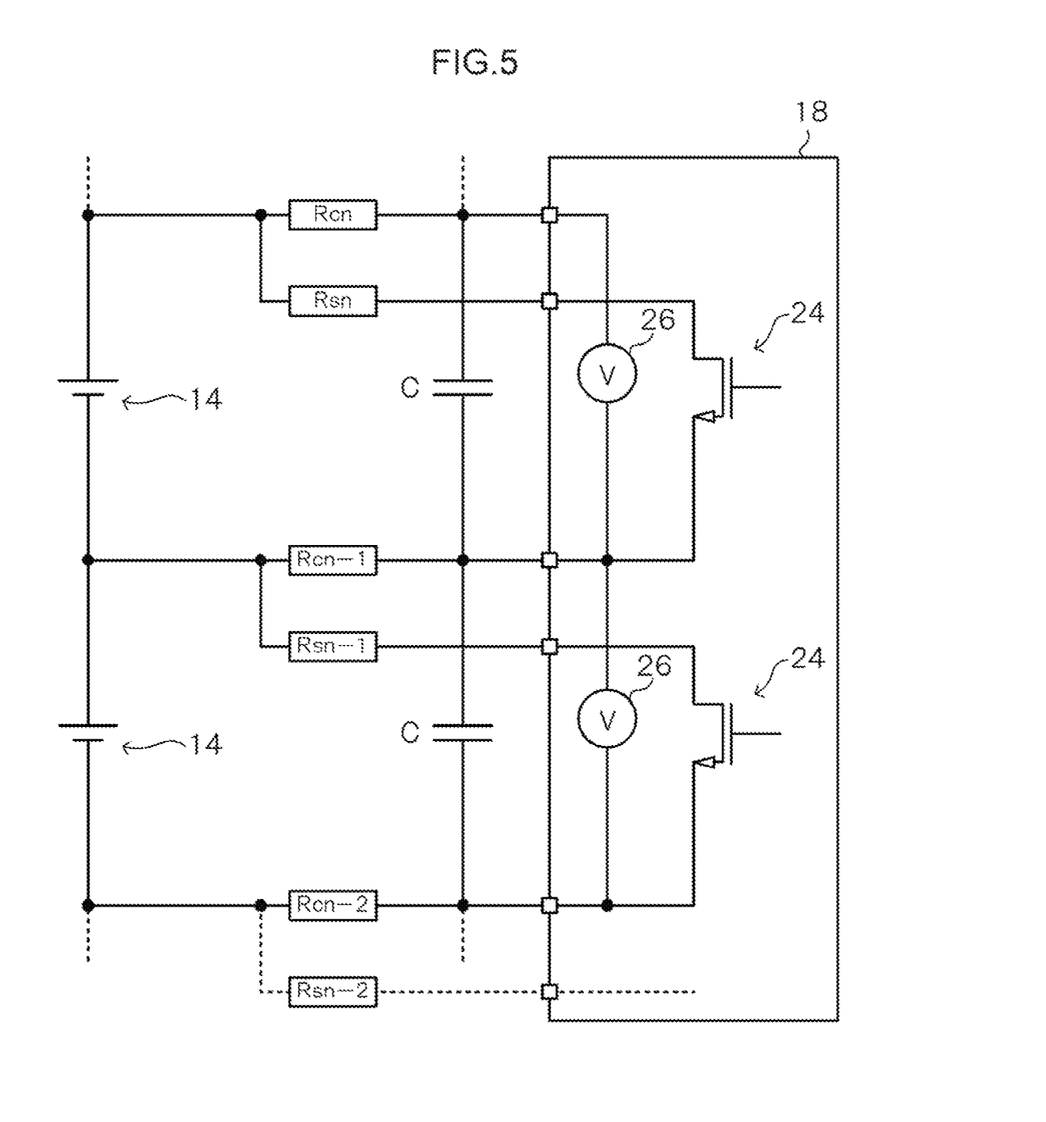
FIG. 5 is a diagram illustrating an example of a detailed configuration of a power supply device, focusing on two adjacent battery cells.

As illustrated in FIG. 5, in the power supply device 10 according to the present exemplary embodiment, the resistors Rcn, Rcn-1 configure common circuitry for adjacent battery cells 14. Thus, if all of the equalization FETs 24 are switched ON, these adjacent battery cells 14 are affected, and so abnormality detection cannot be performed simultaneously on these adjacent battery cells 14. Note that FIG. 5 is a diagram illustrating a detailed configuration of the power supply device 10, focusing on two adjacent battery cells 14.

However, performing abnormality detection simultaneously on non-adjacent battery cells 14 enables the processing time to be reduced compared to the processing in FIG. 4.

Specifically, the equalization FETs 24 of all the battery cells 11 are switched OFF, and the voltage Va of each of the battery cells 14 is measured and acquired. Next, the equalization FETs 24 of odd-numbered battery cells 14 are switched ON while the equalization FETs 21 of even-numbered battery cells 14 remain switched OFF, and the voltage Vb of each of the odd-numbered battery cells 14 is measured and acquired. Next, the equalization FETs 24 of the even-numbered battery cells 14 are switched ON and the equalization FETs 24 of the odd-numbered battery cells 14 are switched OFF, and the voltage Vb of each of the even-numbered battery cells 14 is measured and acquired, estimated voltage Va calc is then computed for each of the battery cells 14, and the estimated voltage Va calc is compared to the measured voltage Va to detect for abnormalities in each of the battery cells 14. This enables the processing time to be reduced compared to cases in which abnormality detection is performed on each of the battery cells 14 in sequence.

Figure 6:
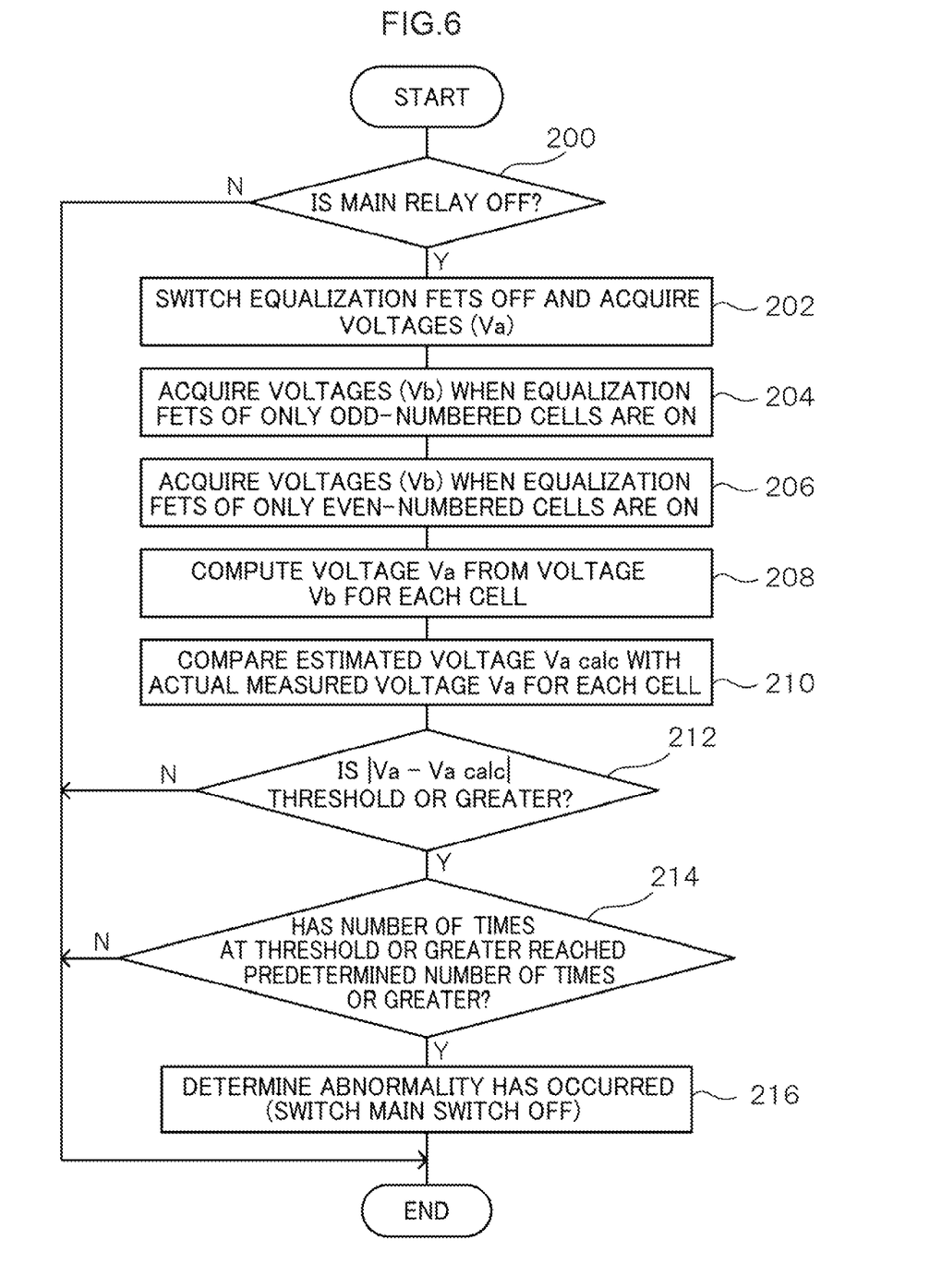
FIG. 6 is a flowchart illustrating an example of a flow of processing performed by a controller of a power supply device according to an exemplary embodiment in a case in which abnormality detection is performed simultaneously on non-adjacent battery cells.

Next, detailed explanation follows regarding processing performed by the controller 20 of the power supply device 10 according to the present exemplary embodiment in a case in which abnormality detection is performed simultaneously on non-adjacent battery cells 14. FIG. 6 is a flowchart illustrating an example of a flow of processing performed by the controller 20 of the power supply device 10 according to the present exemplary embodiment in a case in which abnormality detection is performed simultaneously on non-adjacent battery cells 14. The processing in FIG. 6 may for example be implemented periodically at predetermined intervals.

At step 200, the CPU 20A determines whether or not the main relay 16 has been switched OFF. Since voltage measurement is to be performed plural times, this determination is performed to ensure that a situation is in place in which current is not flowing in the battery. If current is flowing, voltage measurement error could occur, leading to incorrect determination. Thus, in the present exemplary embodiment, as an example, determination is made as to whether or not the main relay 16 has been switched OFF. However, determination that a situation is in place in which current is not flowing in the battery 12 may be made by another method. The series of processing is ended in cases in which this determination is negative, whereas processing transitions to step 202 in cases in which this determination is affirmative.

At step 202, the CPU 20A switches the equalization FETs 24 OFF and acquires the voltage Va measured by the AD converters 26. Processing then transitions to step 204.

At step 204, the CPU 20A switches the equalization FETs 24 of only the odd-numbered battery cells 14 ON and acquires the voltages Vb measured by the corresponding AD converters 26. Processing then transitions to step 206.

At step 206, the CPU 20A switches the equalization FETs 24 of only the even-numbered battery cells 14 ON and acquires the voltages Vb measured by the corresponding AD converters 26. Processing then transitions to step 208.

At step 208, the CPU 20A computes the voltage Va from the voltage Vb for each of the battery cells 14, and processing transitions to step 210. Namely, the estimated voltage Va calc is computed from the voltage Vb using Equation (1) described previously.

At step 210, the CPU 20A compares the estimated voltage Va calc to the actual measured voltage Va for each of the battery cells 14, and processing transitions to step 212.

At step 212, the CPU 20A determines whether or not |Va−Va calc| is a predetermined threshold or greater. Namely, determination is made as to whether or not there is a battery cell 14 for which the estimated voltage Va calc diverges from the actual measured voltage Va by the threshold or greater. The series of processing is ended in cases in which this determination is negative, whereas processing transitions to step 214 in cases in which this determination is affirmative.

At step 214, the CPU 20A determines whether or not the number of times at the threshold or greater has reached a predetermined number of times or greater. This determination as to whether or not the number of times at the threshold or greater has reached the predetermined number of times or greater is performed in order to suppress incorrect determination of an abnormality for each of the battery cells 14. The series of processing is ended in cases in which this determination is negative, whereas processing transitions to step

216 in cases in which this determination is affirmative. Note that the processing of step 214 may be omitted.

At step 216, the CPU 20A determines that an abnormality has occurred, switches the main relay 16 OFF, and ends the series of processing. Thus, power supply to the load 22 is stopped in cases in which an abnormality is determined to have occurred, thereby enabling a failsafe to be implemented in the event of an abnormality.

In this manner, the voltages Vb are acquired when the equalization FETs 24 of non-adjacent battery cells 14 are ON, thereby enabling the voltages Vb of plural battery cells 14 to be acquired simultaneously. This enables the processing time to be reduced compared to abnormality detection performed by acquiring the voltages Va and Vb of each of the battery cells 14 in sequence as in the processing in FIG. 4.

Note that although an example has been described in which the battery cells 14 are divided into odd-numbered and even-numbered battery cells when switching the corresponding equalization FETs 24 ON to acquire the voltages Vb in the processing in FIG. 6, there is no limitation thereto. As long as the equalization FETs 24 of non-adjacent battery cells 14 are switched ON and the corresponding voltages Vb are acquired, there is no limitation to using odd-numbered and even-numbered battery cells.

Figure 7:
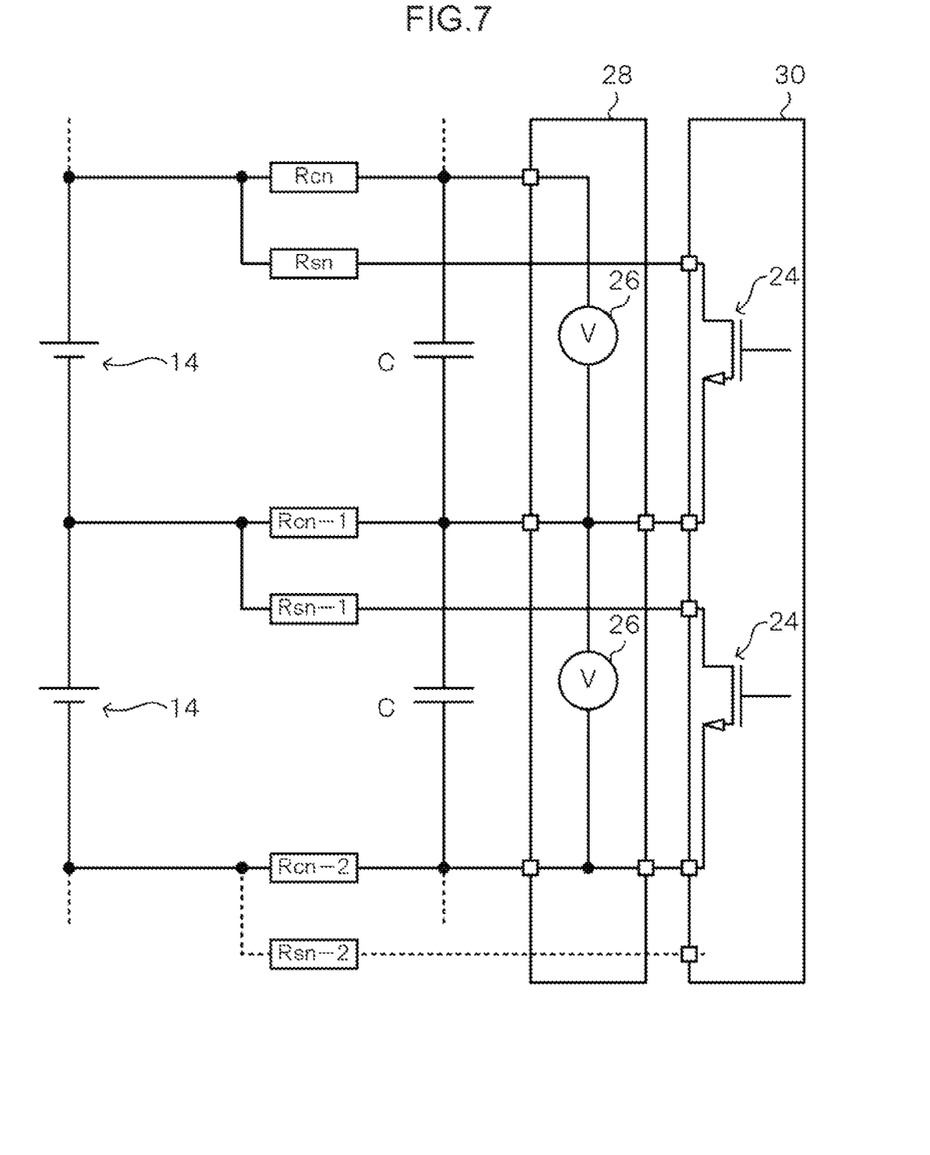
FIG. 7 is a diagram illustrating an example in which AD converters and equalization FETs are contained in separate ICs.

Moreover, although an example has been described in which the AD converters 26 that detect the voltages of the respective battery cells and the equalization FET 24 are contained in a single IC in the present exemplary embodiment, there is no limitation thereto. For example, as illustrated in FIG. 7, an IC 28 for voltage detection that contains the AD converters 26, and an IC 30 for voltage equalization that contains the equalization FETs 24, may be configured as separate ICs. Note that FIG. 7 is a diagram illustrating an example in which the AD converters 26 and the equalization FETs 24 are contained in separate ICs. Alternatively, plural ICs may be provided, each IC containing AD converters 26 and equalization FETs 24 and applied to a prescribed number of battery cells 14. Alternatively, in cases in which an IC containing AD converters 26 and an IC containing equalization FETs 24 are provided, plural of each type of IC may be provided with each IC similarly handling a prescribed number of battery cells 14.

Moreover, although the voltage Va is estimated from the voltage Vb in the above exemplary embodiment, there is no limitation thereto. The voltage Vb may be estimated from the voltage Va, and the estimated voltage Vb calc compared to the measured voltage Vb to determine whether or not an abnormality has occurred. In such cases, the controller estimates the voltage Vb from the voltage Va measured by the AD converter 26 using Equation (2) below to compute the estimated voltage Vb calc. If no abnormalities have occurred, the estimated voltage Vb calc is equivalent to the voltage Vb.

$$Vb\ calc = Va \times \frac{Rsn}{Rcn - 1 + Rsn} \quad (2)$$

Note that although the processing executed by the controller 20 in the above exemplary embodiment is described as software processing performed by the CPU loading and executing a program, there is no limitation to a CPU, and for example a graphics processing unit (GPU) may be employed instead. Alternatively, the processing may for example be performed by hardware such as an application specific integrated circuit (ASIC) or a field-programmable gate array (FPGA). Alternatively, the processing may be performed by a combination of both hardware and software. In cases in which the processing is software processing, the program may be stored in and distributed through various non-transitory storage media.

Furthermore, the present disclosure is not limited to the above description, and various other modifications may be implemented within a range not departing from the spirit of the present disclosure.

An object of the present disclosure is to provide a battery abnormality detection device capable of detecting abnormalities including failure and leakage of elements.

A first aspect of the present disclosure is a battery abnormality detection device that includes: a memory; and a processor coupled to the memory, the processor being configured to: for an equalization circuit including a discharge circuit provided with a switch that, in a case of being switched ON, causes a battery cell to discharge, and including a detector connected to the battery cell in parallel to the discharge circuit so as to detect a voltage of the battery cell, acquire a first voltage in a case in which the switch has been switched OFF and a second voltage in a case in which the switch has been switched ON, as detected by the detector, and estimate, from a detected value of one of the acquired first voltage or second voltage, an estimated value of another of the acquired first voltage or second voltage, and determine whether or not an abnormality has occurred in the equalization circuit based on the detected value and the estimated value.

In the first aspect, the equalization circuit includes the discharge circuit and the detector. The discharge circuit includes the switch, and causes the battery cell to discharge by switching the switch ON. The detector is connected to the battery cell in parallel to the discharge circuit so as to detect the voltage of the battery cell.

This enables abnormalities including failure or leakage of elements such as a switch or a capacitor included in the equalization circuit to be detected.

A second aspect of the present disclosure is the battery abnormality detection device of the first aspect, wherein: the equalization circuit is connected between a plurality of the battery cells connected together in series by connection through an interposed common circuit; and the processor is configured to switch to ON a switch corresponding to each of a plurality of the battery cells that are non-adjacent, and to acquire respective second voltages of the plurality of battery cells from the detector. This enables the processing time to be reduced compared to cases in which the second voltage of each of the battery cells is acquired in sequence.

A third aspect of the present disclosure is the battery abnormality detection device of the first or second claim, wherein the processor is configured to determine the abnormality a plurality of times, and to determine that an abnormality has occurred in the equalization circuit in a case in which a number of times a difference between the detected value and the estimated value has been a predetermined threshold or greater has reached a predetermined number of times or greater. This enables incorrect determination of an abnormality to be suppressed.

A fourth aspect of the present disclosure is the battery abnormality detection device of any of the first to third aspects, wherein a main switch enabling ON/OFF switching of power supply from the battery cell to a load is switched OFF by the processor in a case in which an abnormality has been detected in the equalization circuit. This enables an abnormality failsafe in which the power supply is stopped to be implemented in cases in which an abnormality has occurred.

A fifth aspect of the present disclosure is a battery abnormality detection method, the battery abnormality detection method that includes, for an equalization circuit including a discharge circuit provided with a switch that, in a case of being switched ON, causes a battery cell to discharge and including a detector connected to the battery cell in parallel to the discharge circuit so as to detect a voltage of the battery cell, by a processor: acquiring a first voltage in a case in which the switch has been switched OFF and a second voltage in a case in which the switch has been switched ON, as detected by the detector, and estimating, from a detected value of one of the acquired first voltage or second voltage, an estimated value of another of the acquired first voltage or second voltage and determining whether or not an abnormality has occurred in the equalization circuit based on the detected value and the estimated value.

A sixth aspect of the present disclosure is a non-transitory computer readable recording medium recorded with a program executable by a computer to perform battery abnormality detection processing that includes, for an equalization circuit including a discharge circuit provided with a switch that, in a case of being switched ON, causes a battery cell to discharge and including a detector connected to the battery cell in parallel to the discharge circuit so as to detect a voltage of the battery cell: acquiring a first voltage in a case in which the switch has been switched OFF and a second voltage in a case in which the switch has been switched ON, as detected by the detector, and estimating, from a detected value of one of the acquired first voltage or second voltage, an estimated value of another of the acquired first voltage or second voltage, and determining whether or not an abnormality has occurred in the equalization circuit based on the detected value and the estimated value.

The present disclosure provides a battery abnormality detection device capable of detecting abnormalities including failure and leakage of elements.

The invention claimed is:

1. A battery abnormality detection device comprising:
   a memory; and
   a processor coupled to the memory,
   the processor being configured to:
      for an equalization circuit including a discharge circuit provided with a switch that, in a case of being switched ON, causes a battery cell to discharge, and including a detector connected to the battery cell in parallel to the discharge circuit so as to detect a voltage of the battery cell,
      acquire a first voltage in a case in which the switch has been switched OFF and a second voltage in a case in which the switch has been switched ON, as detected by the detector, and
      estimate, from a detected value of one of the acquired first voltage or second voltage, an estimated value of another of the acquired first voltage or second voltage, and determine whether or not an abnormality has occurred in the equalization circuit based on the detected value and the estimated value.

2. The battery abnormality detection device of claim 1, wherein:
   the equalization circuit is connected between a plurality of the battery cells connected together in series by connection through an interposed common circuit; and
   the processor is configured to switch to ON a switch corresponding to each of a plurality of the battery cells that are non-adjacent, and to acquire respective second voltages of the plurality of battery cells from the detector.

3. The battery abnormality detection device of claim 1, wherein the processor is configured to determine the abnormality a plurality of times, and to determine that an abnormality has occurred in the equalization circuit in a case in which a number of times a difference between the detected value and the estimated value has been a predetermined threshold or greater has reached a predetermined number of times or greater.

4. The battery abnormality detection device of claim 1, wherein a main switch enabling ON/OFF switching of power supply from the battery cell to a load is switched OFF by the processor in a case in which an abnormality has been detected in the equalization circuit.

5. A battery abnormality detection method, the battery abnormality detection method comprising,
   for an equalization circuit including a discharge circuit provided with a switch that, in a case of being switched ON, causes a battery cell to discharge and including a detector connected to the battery cell in parallel to the discharge circuit so as to detect a voltage of the battery cell,
   by a processor:
      acquiring a first voltage in a case in which the switch has been switched OFF and a second voltage in a case in which the switch has been switched ON, as detected by the detector, and
      estimating, from a detected value of one of the acquired first voltage or second voltage, an estimated value of another of the acquired first voltage or second voltage, and determining whether or not an abnormality has occurred in the equalization circuit based on the detected value and the estimated value.

6. The battery abnormality detection method of claim 5, wherein:
   the equalization circuit is connected between a plurality of the battery cells connected together in series by connection through an interposed common circuit; and
   a switch corresponding to each of a plurality of the battery cells that are non-adjacent is switched to ON, and respective second voltages of the plurality of battery cells from the detector are acquired.

7. The battery abnormality detection method of claim 5, wherein the abnormality is determined a plurality of times, and it is determined that an abnormality has occurred in the equalization circuit in a case in which a number of times a difference between the detected value and the estimated value has been a predetermined threshold or greater has reached a predetermined number of times or greater.

8. The battery abnormality detection method of claim 5, wherein a main switch enabling ON/OFF switching of power supply from the battery cell to a load is switched OFF in a case in which an abnormality has been detected in the equalization circuit.

9. A non-transitory computer readable recording medium recorded with a program executable by a computer to perform battery abnormality detection processing comprising,
   for an equalization circuit including a discharge circuit provided with a switch that, in a case of being switched ON, causes a battery cell to discharge and including a detector connected to the battery cell in parallel to the discharge circuit so as to detect a voltage of the battery cell:

acquiring a first voltage in a case in which the switch has been switched OFF and a second voltage in a case in which the switch has been switched ON, as detected by the detector, and estimating, from a detected value of one of the acquired first voltage or second voltage, an estimated value of another of the acquired first voltage or second voltage, and determining whether or not an abnormality has occurred in the equalization circuit based on the detected value and the estimated value.

10. The non-transitory computer readable recording medium of claim 9, wherein:

the equalization circuit is connected between a plurality of the battery cells connected together in series by connection through an interposed common circuit; and a switch corresponding to each of a plurality of the battery cells that are non-adjacent is switched to ON, and respective second voltages of the plurality of battery cells from the detector are acquired.

11. The non-transitory computer readable recording medium of claim 9, wherein the abnormality is determined a plurality of times, and it is determined that an abnormality has occurred in the equalization circuit in a case in which a number of times a difference between the detected value and the estimated value has been a predetermined threshold or greater has reached a predetermined number of times or greater.

12. The non-transitory computer readable recording medium of claim 9, wherein a main switch enabling ON/OFF switching of power supply from the battery cell to a load is switched OFF in a case in which an abnormality has been detected in the equalization circuit.

* * * * *